United States Patent
Okazaki et al.

(10) Patent No.: US 7,932,659 B2
(45) Date of Patent: Apr. 26, 2011

(54) SUPERCONDUCTING DEVICE AND AXIAL-TYPE SUPERCONDUCTING MOTOR

(75) Inventors: Toru Okazaki, Osaka (JP); Shingo Ohashi, Osaka (JP); Hidehiko Sugimoto, Fukui (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 542 days.

(21) Appl. No.: 11/996,849

(22) PCT Filed: Apr. 17, 2006

(86) PCT No.: PCT/JP2006/308016
§ 371 (c)(1),
(2), (4) Date: Jan. 25, 2008

(87) PCT Pub. No.: WO2007/013207
PCT Pub. Date: Feb. 1, 2007

(65) Prior Publication Data
US 2010/0148625 A1 Jun. 17, 2010

(30) Foreign Application Priority Data
Jul. 28, 2005 (JP) .................. 2005-219264

(51) Int. Cl.
*H02K 1/12* (2006.01)
(52) U.S. Cl. ............. 310/254.1; 310/114; 310/166
(58) Field of Classification Search ........ 310/254.1, 310/162, 114, 268, 166
See application file for complete search history.

(56) References Cited

U.S. PATENT DOCUMENTS

| | | | | |
|---|---|---|---|---|
| 4,739,200 A | * | 4/1988 | Oberly et al. ............... | 310/10 |
| 5,334,899 A | * | 8/1994 | Skybyk ............... | 310/268 |
| 5,532,663 A | * | 7/1996 | Herd et al. ............... | 335/216 |
| 5,581,135 A | * | 12/1996 | Ito et al. ............... | 310/52 |
| 5,672,921 A | * | 9/1997 | Herd et al. ............... | 310/52 |
| 5,767,601 A | * | 6/1998 | Uchiyama ............... | 310/190 |
| 5,774,032 A | * | 6/1998 | Herd et al. ............... | 335/216 |
| 5,982,070 A | * | 11/1999 | Caamano ............... | 310/216.047 |
| 7,315,103 B2 | * | 1/2008 | Qu et al. ............... | 310/180 |
| 7,598,647 B2 | * | 10/2009 | Okazaki et al. ............... | 310/171 |
| 7,791,246 B2 | * | 9/2010 | Okazaki et al. ............... | 310/268 |

FOREIGN PATENT DOCUMENTS

| | | |
|---|---|---|
| JP | 51-134811 | 11/1976 |
| JP | 01-318540 | 12/1989 |
| JP | 06-006907 | 1/1994 |
| JP | 06-038418 | 2/1994 |
| JP | 09-308222 | 11/1997 |
| JP | 11-318066 | 11/1999 |
| JP | 2000-513197 | 10/2000 |

* cited by examiner

*Primary Examiner* — Thanh Lam
(74) *Attorney, Agent, or Firm* — Drinker Biddle & Reath LLP (57) ABSTRACT

A superconducting device includes a coil formed of a superconducting wire, an iron core to which the coil is attached, and a magnetic material arranged in a magnetic circuit and magnetized by magnetic flux. The magnetic circuit is generated by energization of the coil and passes through the iron core. A gap is formed between the coil and the iron core, or/and a nonmagnetic material is interposed between the coil and the iron core.

5 Claims, 10 Drawing Sheets

SUPERCONDUCTING DEVICE AND AXIAL-TYPE SUPERCONDUCTING MOTOR

TECHNICAL FIELD

The present invention relates to a superconducting device and more particularly to a superconducting device which includes a coil attached to an iron core and formed of a superconducting wire, and which can be applied to a motor, a power generator, a transformer, and a Superconducting Magnetic Energy Storage (SMES), especially suitably applied to an axial-type superconducting motor provided with inductors.

BACKGROUND ART

Recently, development of ships, automobiles, etc., which are operated to run by electrically driving motors, has been progressed with the view of addressing depletion of fuel sources, such as gasoline, and environmental deterioration caused by exhaust gases. In particular, by employing a superconducting motor disclosed in Japanese Unexamined Patent Application Publication No. 6-6907 (Patent Document 1), an ohmic loss in a superconducting coil can be eliminated and efficiency can be increased. Further, the motor size can be reduced and the motor output can be increased.

Superconducting structures using superconducting wires have also become increasingly prevalent in power generators, transformers, etc., in addition to motors.

However, if a magnetic field acts on a superconducting wire, characteristics of the superconducting wire deteriorate, whereby a large current cannot be supplied through the superconducting wire. In a structure that a superconducting coil is attached to an iron core, particularly, a magnetic field generated by energization of the superconducting coil is strengthened by the iron core and acts on the superconducting coil itself. Therefore, a current capable of being supplied to the superconducting coil is reduced and a current density is also reduced. This leads to the problem that the size of the superconducting coil and hence the size of a superconducting device have to be increased in order to supply a desired amount of the current.

That problem will be described in more detail in connection with a C-type magnet (iron core) to which a superconducting coil is attached.

Figure 10:
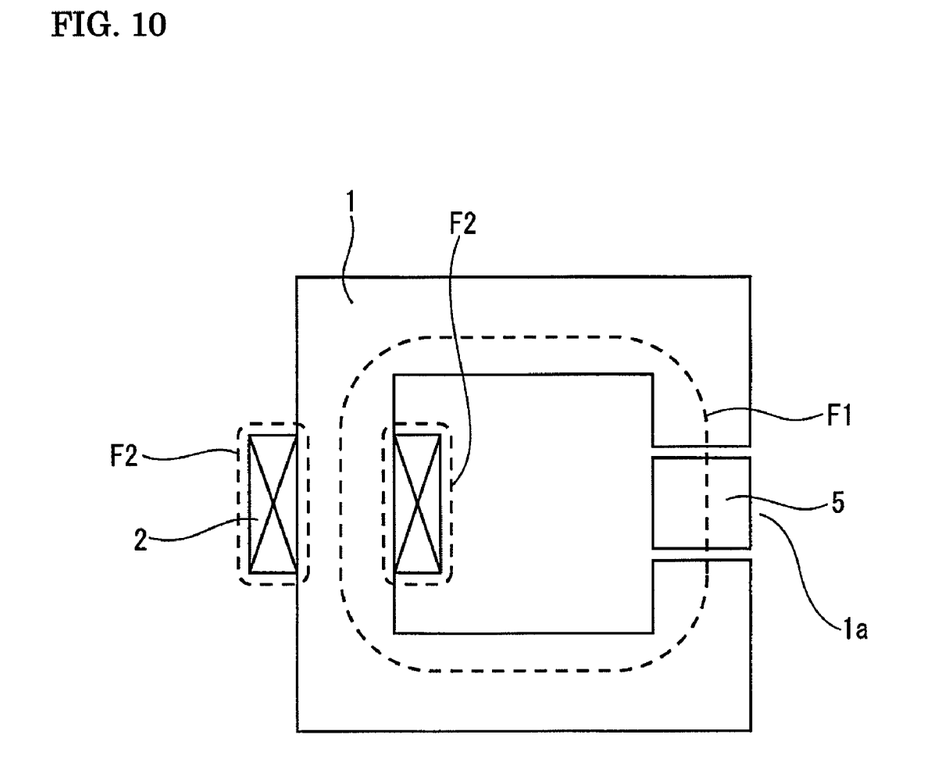
FIG. 10 is an illustration for explaining a basic principle of a related art.

As shown in FIG. 10, a superconducting coil 2 is formed by winding a superconducting wire over a C-type iron core 1 at a desired position with no gap left between the superconducting coil 2 and the C-type iron core 1, and another magnetic material 5 is arranged in a gap 1a of the C-type iron core 1. The magnetic material 5 may also be formed of an iron core. When a current is supplied to the superconducting coil 2, magnetic fluxes F1 and F2 are excited, for example, as indicated by broken lines. The magnetic flux F1 passes through the C-type iron core 1 and generates a magnetic field in the gap 1a, thereby magnetizing the magnetic material 5 arranged in the gap 1a. On the other hand, the magnetic flux F2 passes through air around both the C-type iron core 1 and the superconducting coil 2 in the vicinity of the superconducting coil 2 without passing through the gap 1a. The magnitude of magnetic flux is represented by "magnetomotive force/magnetic resistance". Therefore, if the magnetomotive force is constant, the magnitude of magnetic flux is increased as the magnetic resistance is reduced. This means that the magnetic flux F2 becomes relatively strong because the magnetic flux passes through not only air having a large magnetic resistance (low magnetic permeability), but also the C-type iron core 1 having a small magnetic resistance (high magnetic permeability). As a result, the intensity of a magnetic field acting on the superconducting coil 2 is increased and characteristics of the superconducting coil 2 deteriorate.

Patent Document 1: Japanese Unexamined Patent Application Publication No. 6-6907.

DISCLOSURE OF THE INVENTION

Problems to be Solved by the Invention

In view of the above-described problems, an object of the present invention is to improve a structure for attachment of a superconducting coil to an iron core, thereby weakening the intensity of a magnetic field acting on the superconducting coil itself so that superconducting characteristics will not deteriorate, and to increase a current density in the superconducting coil, thereby reducing the size of the superconducting coil.

Means for Solving the Problems

To solve the above-described problems, the present invention provides a superconducting device comprising:

a coil formed of a superconducting wire;

an iron core to which the coil is attached; and a magnetic material arranged in a magnetic circuit and magnetized by magnetic flux, the magnetic circuit being generated by energization of the coil and passing through the iron core, wherein a gap is formed between the coil and the iron core, or/and a nonmagnetic material is interposed between the coil and the iron core.

With the constitution described above, a gap or/and a nonmagnetic material each serving as magnetic resistance are formed between a coil formed of a superconducting wire (i.e., a superconducting coil) and an iron core to which the superconducting coil is attached. Of magnetic fluxes excited by energization of the superconducting coil, therefore, magnetic flux excited in the vicinity of the superconducting coil (i.e., magnetic flux corresponding to the magnetic flux F2 shown in FIG. 10) passes through at least one of the gap and the nonmagnetic material each having a low magnetic permeability. Thus, since a most part of the magnetic flux excited in the vicinity of the superconducting coil passes through air or/and the nonmagnetic material each having a low magnetic permeability, the magnitude of such magnetic flux can be reduced and a magnetic field acting on the superconducting coil can be weakened. Accordingly, a larger current can be supplied to the superconducting coil without significantly deteriorating superconducting characteristics of the superconducting coil. This means that the current density in the superconducting coil can be increased. As a result, the size of the superconducting coil can be reduced and the size of the superconducting device provided with the superconducting coil can also be reduced.

In general, when a superconducting coil is attached to an iron core, the magnitude of magnetic flux excited in the vicinity of the superconducting coil (i.e., the magnetic flux F2 in FIG. 10) is also increased similarly to magnetic flux acting on another magnetic material (i.e., the magnetic flux F1 in FIG. 10). According to the present invention, however, even when the superconducting coil is attached to the iron core, the magnitude of only the magnetic flux excited in the vicinity of the superconducting coil can be reduced.

Further, since a spacing is left between the superconducting coil and the iron core to weaken the magnetic field acting on the superconducting coil, an AC loss generated in the coil with supply of an AC current to the superconducting coil can be reduced and an equipment loss can also be reduced.

Examples of the nonmagnetic material include fiberglass-reinforced plastic (FRP), stainless steel, tin, aluminum, and copper. The relative permeability of the nonmagnetic material is preferably 100 or less.

When the nonmagnetic material is interposed between the coil and the iron core, several kinds of nonmagnetic materials may be interposed in appropriate combination.

The spacing between the coil and the iron core is preferably set equal to or greater than 0.1 mm and more preferably equal to or greater than 0.5 mm.

With the constitution described above, by setting the spacing equal to or greater than 0.1 mm, the magnetic flux excited in the vicinity of the superconducting coil can be reduced. Also, by setting the spacing equal to or greater than 0.5 mm, the relevant magnetic flux can be further reduced. Another merit is that the superconducting coil can be more easily attached to the iron core and the superconducting device can be more easily manufactured.

Preferably, b>a is satisfied on an assumption that a is a total size of gaps in the magnetic circuit including the magnetized magnetic material and b is a size of the spacing between the coil and the iron core.

When the magnetic flux magnetizing the magnetic material passes through a gap having a low magnetic permeability (e.g., the gap shown in FIG. 10), such magnetic flux is also reduced. In consideration of that point, by setting the relationship between a and b to be b>a, the magnetic flux excited in the vicinity of the superconducting coil can be greatly reduced as compared with the magnetic flux magnetizing the magnetic material. Therefore, the current density in the superconducting coil can be increased so that the magnetic flux magnetizing the magnetic material will not become too small.

The superconducting device according to the present invention can be implemented, for example, in such a practical form that the magnetic material arranged in the magnetic circuit is an inductor attached to a rotor, and the rotor is operated to rotate during the energization.

By utilizing the above-described practical form, a second aspect of the present invention provides an axial-type superconducting motor including inductors.

More specifically, the axial-type superconducting motor is constituted as an axial-type and inductor-type motor comprising, around a rotary shaft, an armature side stator including an armature coil attached to an iron core, a pair of rotors including inductors arranged on both sides of the armature side stator, and a pair of field side stators including field coils arranged on both sides of the rotors, the rotors being fitted over and fixed to the rotary shaft, wherein the armature coil and the field coils are each a coil formed of a superconducting wire, a gap is formed between the armature coil and an iron core to which the armature coil is attached, or/and a nonmagnetic material is interposed between the armature coil and the iron core, and gaps are formed between the field coils and the field side stators serving as iron cores, or/and nonmagnetic materials are interposed between the field coils and the field side stators, wherein the field coils are arranged such that an N pole and an S pole are positioned on respective concentric circles, and wherein the inductors in each of the rotors, which inductors serve as magnetic materials during energization of the armature coil and the field coils, are arranged such that an N-pole inductor positioned to face an N pole of the filed coil and an S-pole inductor positioned to face an S pole of the filed coil are alternately located in a circumferential direction.

The superconducting device having the gap formed between the superconducting coil and the iron core, according to the present invention, can be suitably applied to not only the axial motor, but also a power generator, a transformer, and a Superconducting Magnetic Energy Storage (SMES).

Advantages

According to the present invention, as described above, the gap or/and the nonmagnetic material each serving as magnetic resistance are formed between the coil formed of a superconducting wire (i.e., the superconducting coil) and the iron core to which the superconducting coil is attached. Of magnetic fluxes excited by energization of the superconducting coil, therefore, magnetic flux excited in the vicinity of the superconducting coil passes through the gap or/and the nonmagnetic material each having a low magnetic permeability. Thus, since a most part of the magnetic flux excited in the vicinity of the superconducting coil passes through air or/and the nonmagnetic material each having a low magnetic permeability, the magnitude of the magnetic flux can be reduced and a magnetic field acting on the superconducting coil can be weakened. Accordingly, a larger current can be supplied to the superconducting coil without significantly deteriorating superconducting characteristics of the superconducting coil. This means that the current density in the superconducting coil can be increased. As a result, the size of the superconducting coil can be reduced and the size of the superconducting device provided with the superconducting coil can also be reduced.

REFERENCE NUMERALS

3 gap
10 inductor-type motor 11, 15 field side stators (iron cores)
12, 14 rotors
13 armature side stator
18, 31 field coils
20, 28 N-pole inductors
21, 27 S-pole inductors
24 armature coil
25 flux collector (iron core)
40, 41 nonmagnetic materials
F1, F2 magnetic fluxes

BEST MODE FOR CARRYING OUT THE INVENTION

Embodiments of the present invention will be described with reference to the drawings.

Initially, a basic principle of the present invention is described in connection with a C-type iron core.

Figure 8:
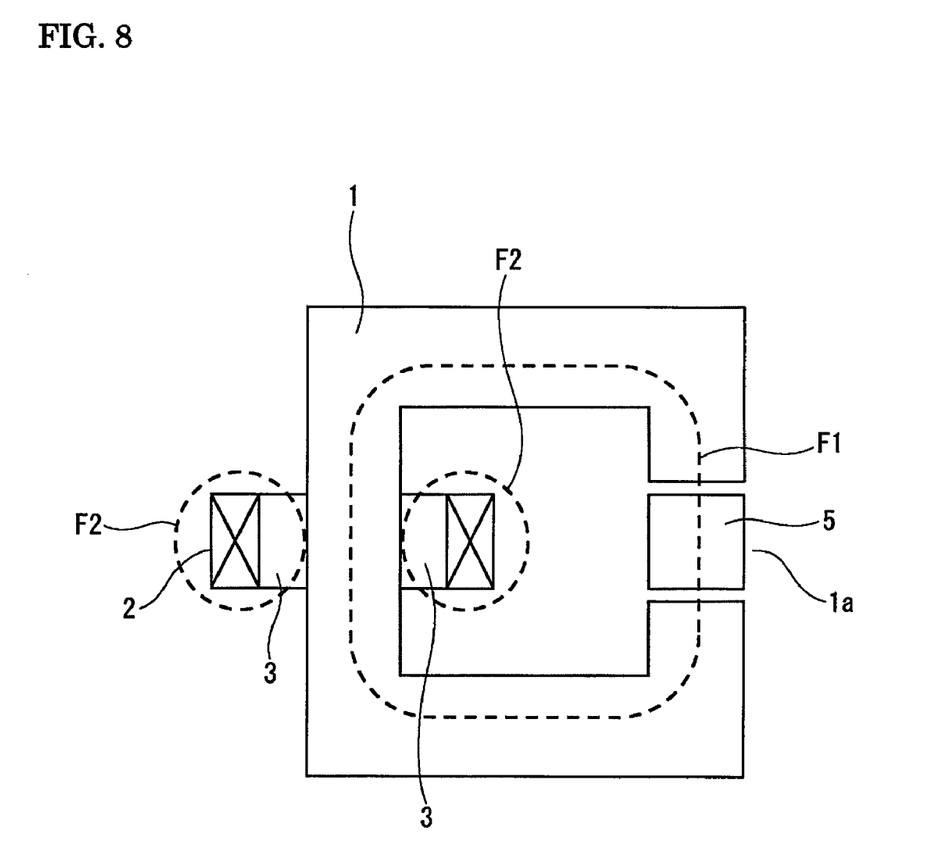
FIG. 8 is an illustration for explaining a basic principle of the present invention.

As shown in FIG. 8, a superconducting coil 2 made of a superconducting wire is attached to a C-type iron core 1 at a desired position with a gap 3 left between the superconducting coil 2 and the C-type iron core 1 for providing magnetic resistance at a desired level, and a magnetic material 5 is arranged in a gap 1a of the C-type iron core 1. When a current is supplied to the superconducting coil 2, magnetic fluxes F1 and F2 are excited, for example, as indicated by broken lines. The magnetic flux F1 passes through the C-type iron core 1 and generates a magnetic field in the gap 1a, thereby magnetizing the magnetic material arranged in the gap 1a. On the other hand, the magnetic flux F2 passes through air around the superconducting coil 2 without passing through the C-type iron core 1. Because the magnetic flux F2 passes through only air having a low magnetic permeability, the air serves as magnetic resistance and the magnetic flux F2 is generated in a smaller magnitude. Therefore, the intensity of a magnetic field acting on the superconducting coil 2 is reduced so that characteristics of the superconducting coil 2 will not significantly deteriorate. As a result, the current density in the superconducting coil can be increased and the size of the superconducting coil can be reduced.

Incidentally, by setting the size of the gap 3 between the C-type iron core 1 and the superconducting coil 2 to a larger value, the magnetic flux F2 passing through only air is increased and the intensity of the magnetic field acting on the superconducting coil 2 can be reduced.

Figure 1A:
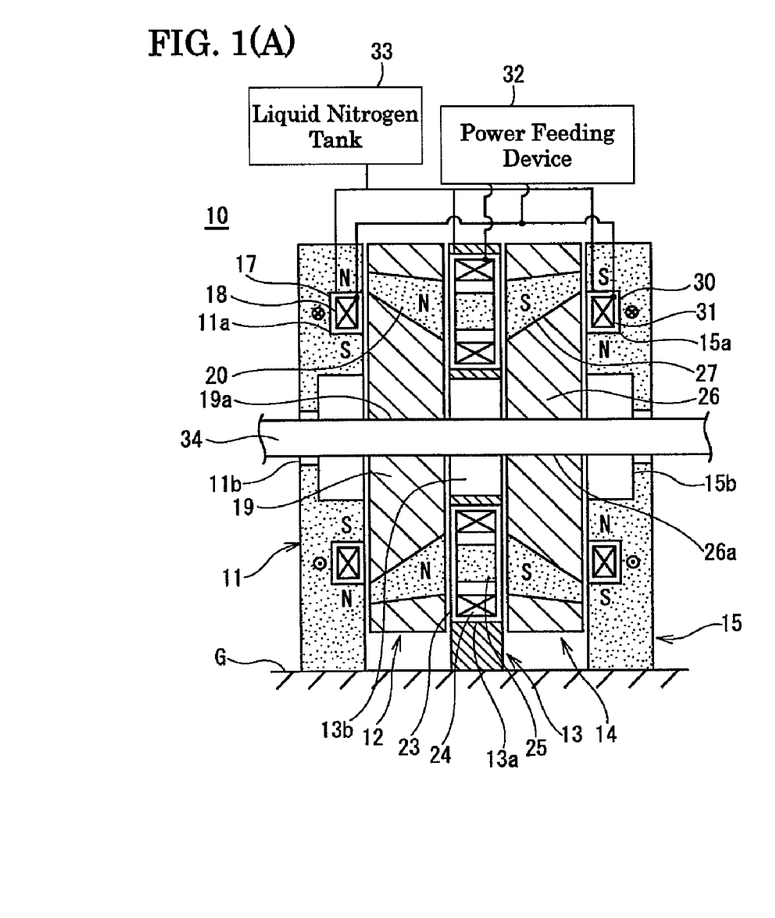
FIG. 1(A) is a sectional view of an inductor-type motor according to a first embodiment of the present invention.
Figure 1B:
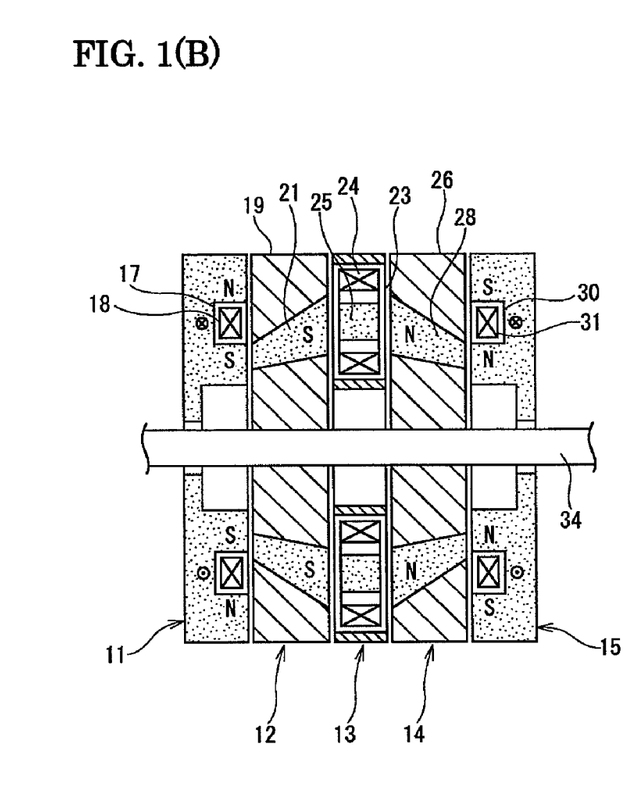
FIG. 1(B) is a sectional view of the inductor-type motor with rotors rotated 90° from their positions shown in FIG. 1(A).

FIG. 1 shows an inductor-type motor 10 according to a first embodiment of the present invention. The inductor-type motor 10 utilizes the principle described above in connection with the C-type iron core.

The inductor-type motor 10 has an axial gap structure. More specifically, a rotary shaft 34 penetrates through a field side stator 11, a rotor 12, an armature side stator 13, a rotor 14, and a field side stator 15 successively in the order named. The field side stators 11 and 15 and the armature side stator 13 are each fixed to an installation surface G with a gap left relative to the rotary shaft 34. The rotors 12 and 14 are externally fitted over and fixed to the rotary shaft 34.

Figure 2A:
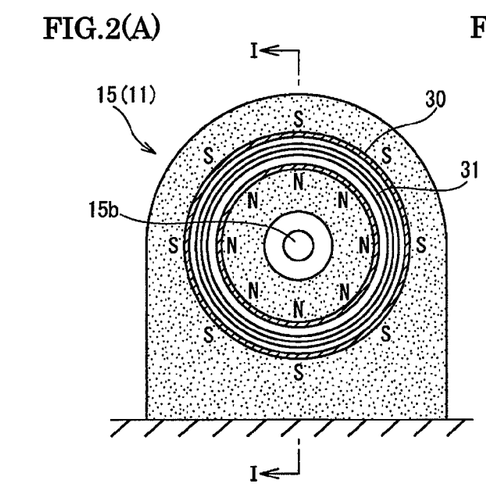
FIG. 2(A) is a front view of a field side stator.
Figure 2B:
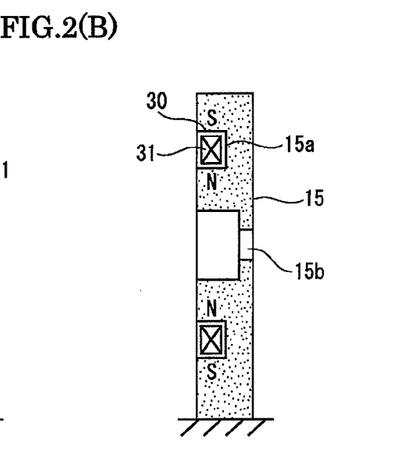
FIG. 2(B) is a sectional view taken along a line I-I in FIG. 2(A)
Figure 2C:
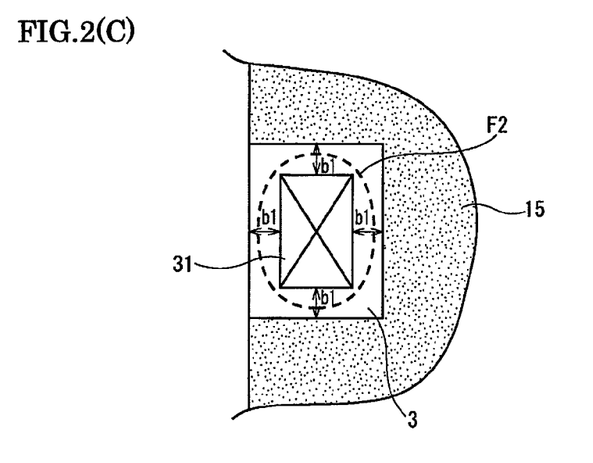
FIG. 2(C) is an enlarged view of a principal part of the field side stator.

Since the field side stator 11 and the field side stator 15 are bilaterally symmetric, FIGS. 2(A), 2(B) and 2(C) show one field side stator 15 as a representative.

The field side stators 11 and 15 (iron cores) are each made of a magnetic material and are fixed to the installation surface G. The field side stators 11 and 15 include respectively heat-insulated coolant containers 17 and 30 which have a vacuum heat-insulated structure and are mounted to the field side stators, and field coils 18 and 31 which are windings made of superconducting wires and are held in the heat-insulated coolant containers 17 and 30.

Between each field side stator 11, 15 and each field coil 18, 31, as shown in FIG. 2(C), a gap 3 is left around the entire periphery of the field coil 18, 31. The spacing between the field side stator 11, 15 and the field coil 18, 31 in the gap is set to b. In this embodiment, b1=0.5 mm is set. By forming the gap 3 around the field coil 18, 31, in the inductor-type motor 10 of this embodiment, magnetic flux corresponding to the magnetic flux F2 described above in connection with the C-type iron core is reduced and a magnetic field acting on the field coil 18, 31 is weakened.

Additionally, a nonmagnetic material made of resin, aluminum, brass, or the like is interposed between the field side stator 11, 15 and the field coil 18, 31 to support the field coil 18, 31 in the state that the gap 3 is left between the field side stator 11, 15 and the field coil 18, 31.

The field side stators 11 and 15 have respectively loose-fit holes 11b and 15b which are bored at stator centers in size larger than the outer diameter of the rotary shaft 34, and grooves 11a and 15a which are recessed in the toric form around the loose-fit holes 11b and 15b. The field coils 18 and 31 are held respectively in the heat-insulated coolant containers 17, 30 while liquid nitrogen is circulated therein. The heat-insulated coolant containers 17 and 30 are placed respectively in the grooves 11a and 15a.

The field side stators 11 and 15 are each made of a magnetic material, e.g., permendur, a silicon steel plate, iron, or permalloy. The superconducting wires used to form the field coils 18 and 31 are, for example, bismuth or yttrium based superconducting wires.

Since the rotors 12 and 14 are bilaterally symmetric, FIGS. 3(A)-3(D) show one rotor 14 as a representative.

The rotors 12 and 14 include respectively disk-shaped support members 19 and 26 which are each made of a nonmagnetic material and have holes 19a and 26a for mounting to the rotary shaft, a pair of S-pole inductors 21 and 27 which are embedded in the support members 19 and 26 at point-symmetric positions about the mounting holes 19a and 26a, and a pair of N-pole inductors 20 and 28 which are embedded in the support members 19 and 26 at positions rotated 90° from the positions of the S-pole inductors 21 and 27.

Figure 3A:
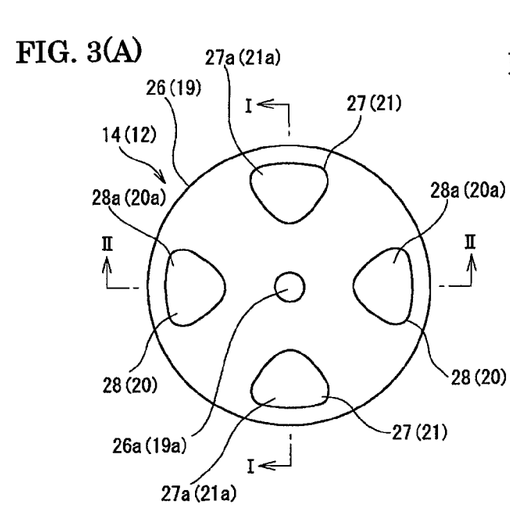
FIG. 3(A) is a front view of the rotor.
Figure 3B:
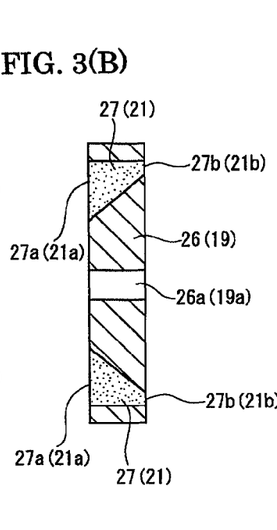
FIG. 3(B) is a sectional view taken along a line I-I in FIG. 3(A)
Figure 3C:
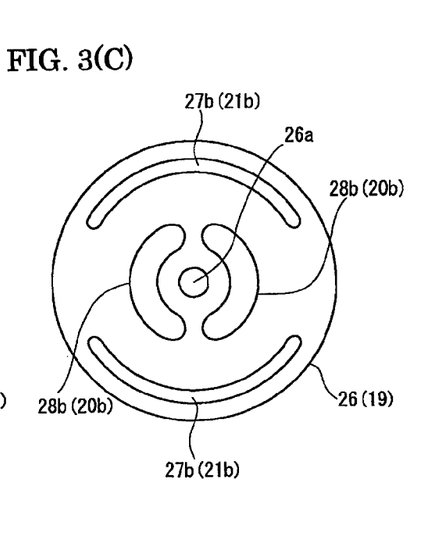
FIG. 3(C) is a rear view.
Figure 3D:
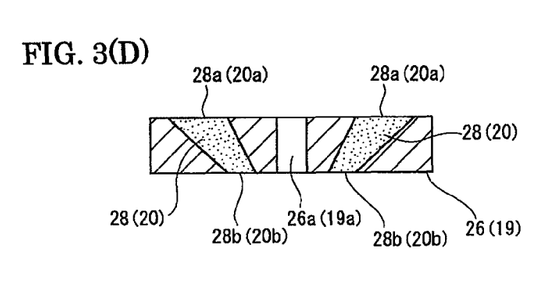
FIG. 3(D) is a sectional view taken along a line II-II in FIG. 3(A).

The S-pole inductors 21 and 27 and the N-pole inductors 20 and 28 have respectively sector-shaped one end surfaces 20a, 21a, 27a and 28a which are arranged to face the armature side stator 13 at equal intervals on respective concentric circles and have the same area.

Figure 4A:
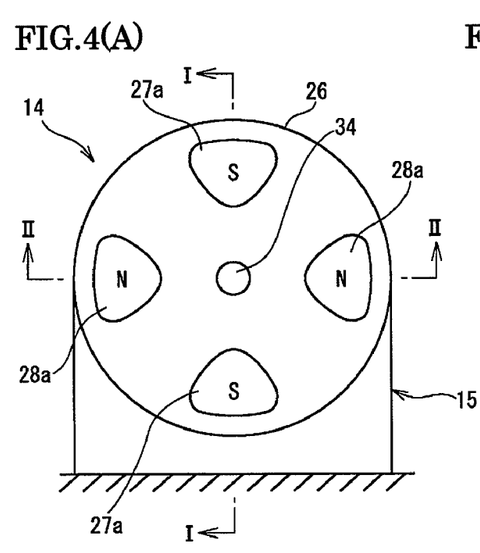
FIG. 4(A) is a front view showing a state where a rotary shaft penetrates through the rotor and the field side stator.
Figure 4B:
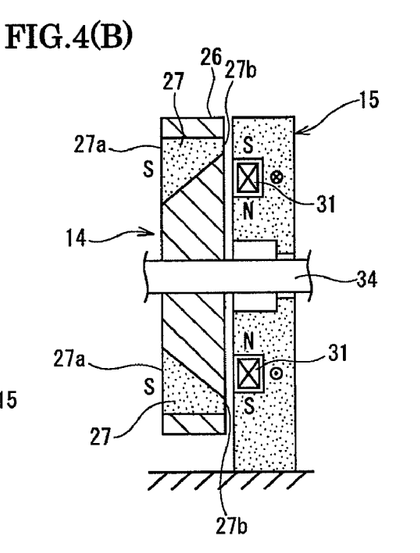
FIG. 4(B) is a sectional view taken along a line I-I in FIG. 4(A)

The other end surfaces 21b and 27b of the S-pole inductors 21 and 27 are arranged to face respective positions where S-poles are generated by the field coils 18 and 31. For example, as shown in FIGS. 2(C) and 4(B), the other end surface 27b of the S-pole inductor 27 has an arc shape positioned to face the outer peripheral side of the field coil 31.

Figure 4C:
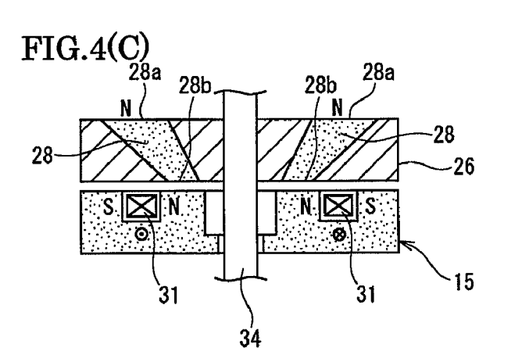
FIG. 4(C) is a sectional view taken along a line II-II in FIG. 4(A).

The other end surfaces 20b and 28b of the N-pole inductors 20 and 28 are arranged to face respective positions where N-poles are generated by the field coils 18 and 31. For example, as shown in FIGS. 3(B) and 4(C), the other end surface 28b of the N-pole inductor 28 has an arc shape positioned to face the inner peripheral side of the field coil 31.

Thus, the S-pole inductors 21 and 27 and the N-pole inductors 20 and 28 have such three-dimensional shapes that their sectional shapes are continuously changed from the arc-shaped other end surfaces 20b, 21b, 27b and 28b in the axial direction and the one end surfaces 20a, 21a, 27a and 28a each have a sector-like shape. Also, the sectional areas of the S-pole inductors 21 and 27 and the N-pole inductors 20, 28 are each constant from the other end surfaces 20b, 21b, 27b and 28b to the one end surfaces 20a, 21a, 27a and 28a. Further, the other end surfaces 20b and 28b of the S-pole inductors 20 and 28 have the same area as the other end surfaces 21b and 27b of the N-pole inductors 21 and 27.

The support member 19, 26 is made of a nonmagnetic material, e.g., FRP or stainless steel. The inductors 27 and 28 each is made of a magnetic material, e.g., permendur, a silicon steel plate, iron, or permalloy.

As shown in FIGS. 1(A) and 1(B), the armature side stator 13 made of a nonmagnetic material is fixed to the installation surface G. The armature side stator 13 includes heat-insulated coolant containers 23 having a vacuum heat-insulated structure, and armature coils 24 which are windings made of superconducting wires and are held in the heat-insulated coolant containers 23, respectively.

Figure 5:
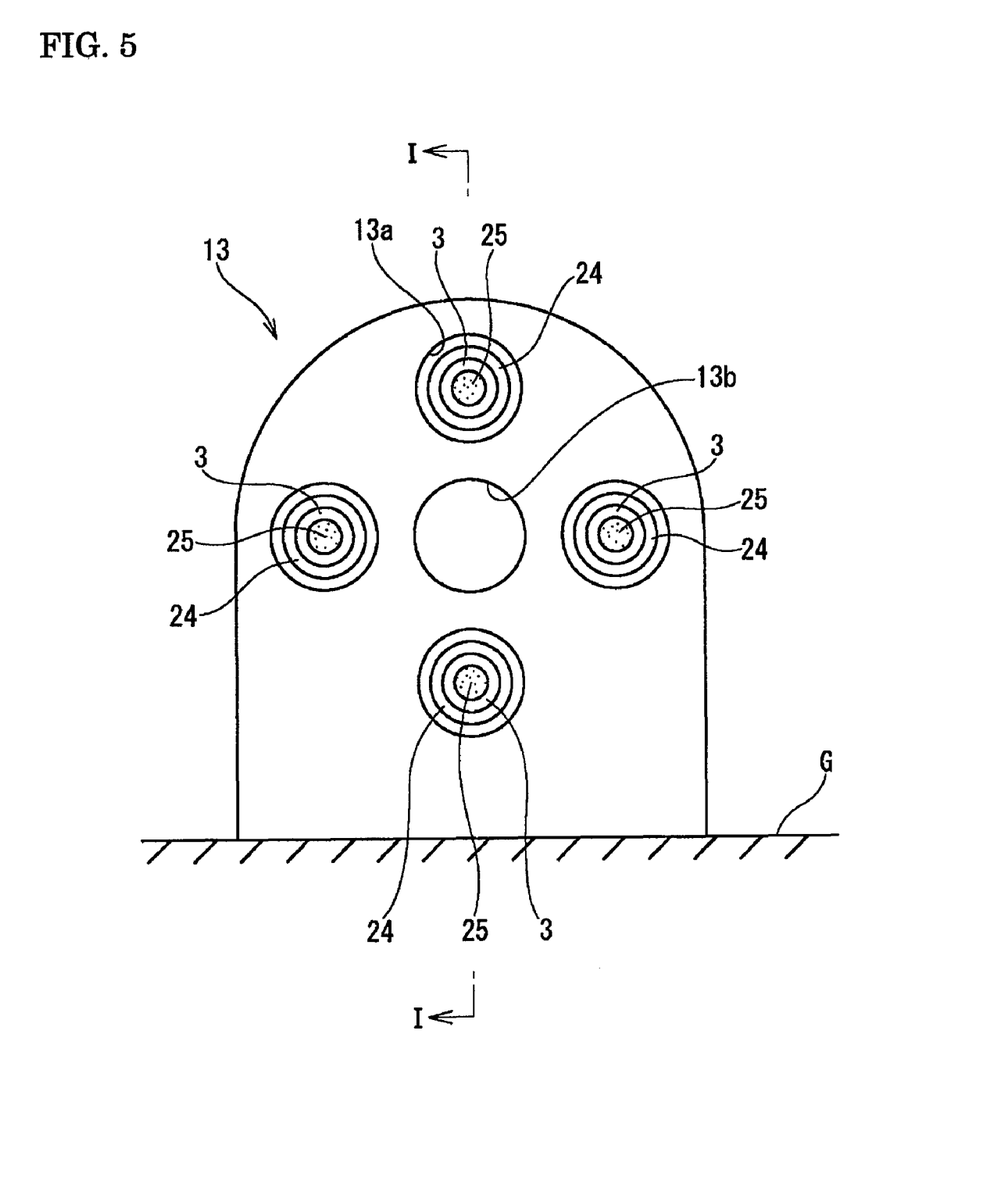
FIG. 5 is a front view of an armature side stator.
Figure 6:
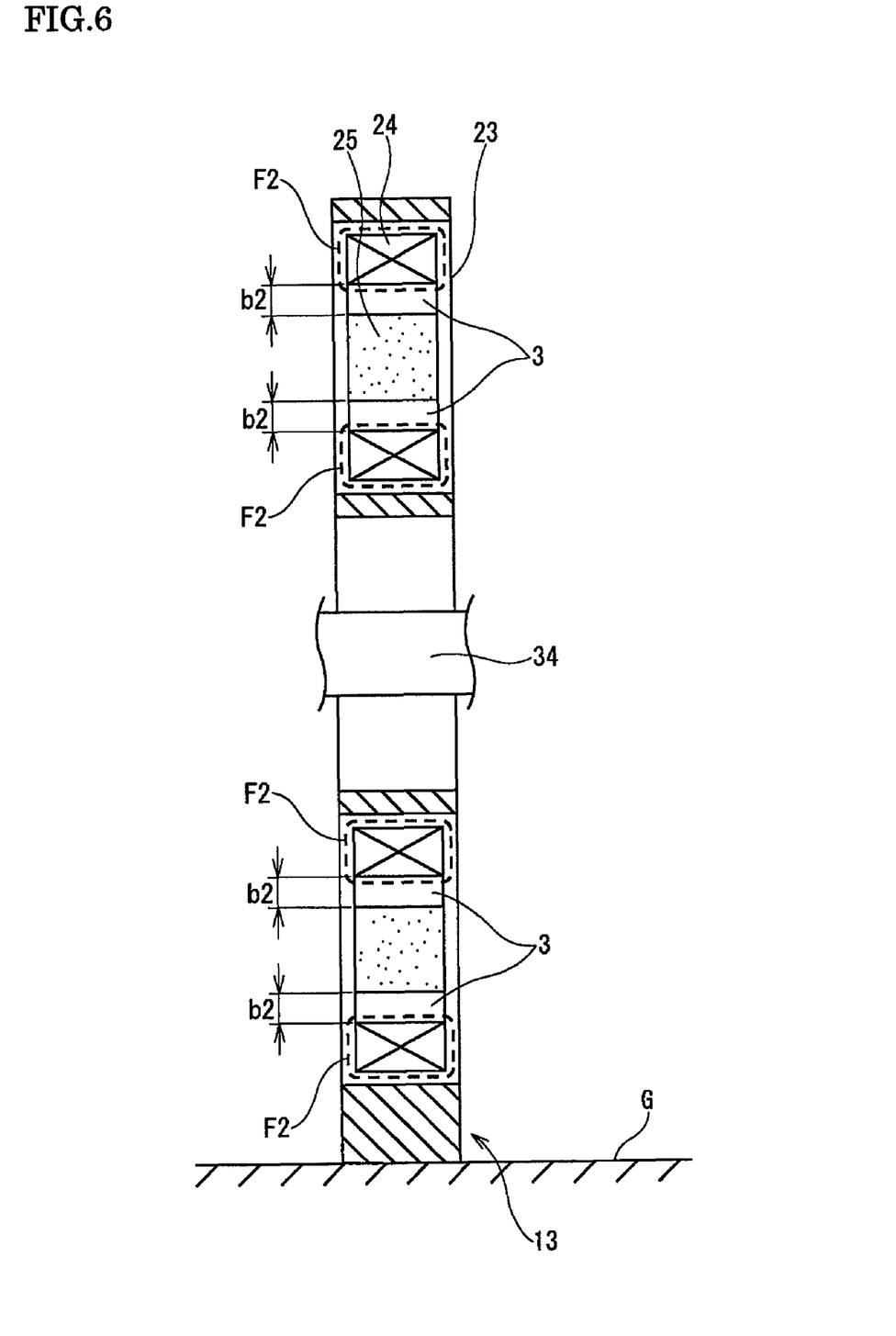
FIG. 6 is a sectional view taken along a line I-I in FIG. 5.

The armature side stator 13 has a loose-fit hole 13b which is bored at its center in size larger than the outer diameter of the rotary shaft 34, and four mounting holes 13a which are bored at equal intervals in the circumferential direction around the loose-fit hole 13b. The armature coils 24 are held respectively in the heat-insulated coolant containers 23 while liquid nitrogen is circulated therein, and a flux collector 25 (iron core) made of a magnetic material is arranged in a hollow portion of each armature coil 24. Four heat-insulated coolant containers 23 holding the armature coils 24 therein are placed respectively in the coil mounting holes 13a.

Each of the armature coils 24 is not directly wound over the outer peripheral surface of the flux collector 25. As shown in FIGS. 5 and 6, a gap 3 is left between the inner peripheral surface of the armature coil 24 and the outer peripheral surface of the flux collector 25. More specifically, the spacing between the inner peripheral surface of the armature coil 24 and the outer peripheral surface of the flux collector 25 is set to 5 mm, i.e., b2=5 mm. In other words, as with the field coils 18 and 31, a gap 3 is formed around the armature coil 24 to reduce a magnetic field acting on the armature coil 24.

The flux collector 25 is made of a magnetic material, e.g., permendur, a silicon steel plate, iron, or permalloy. The superconducting wires used to form the armature coils 24 are, for example, bismuth or yttrium based superconducting wires. Further, the armature side stator 13 is made of a nonmagnetic material, e.g., FRP or stainless steel.

Figure 7A:
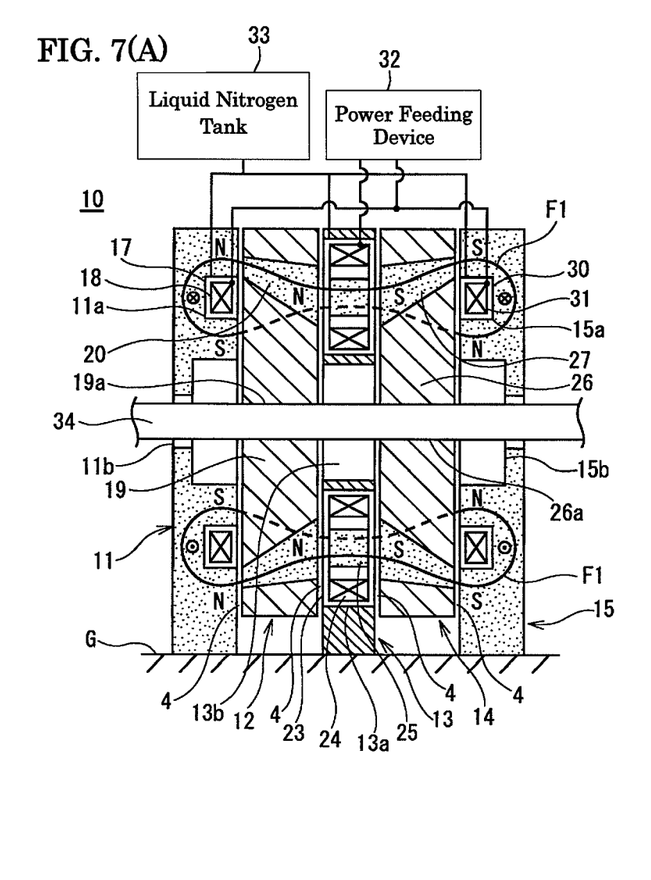
FIGS. 7(A) and 7(B) are each a sectional view showing a state where magnetic fluxes are excited in the inductor-type motor.
Figure 7B:
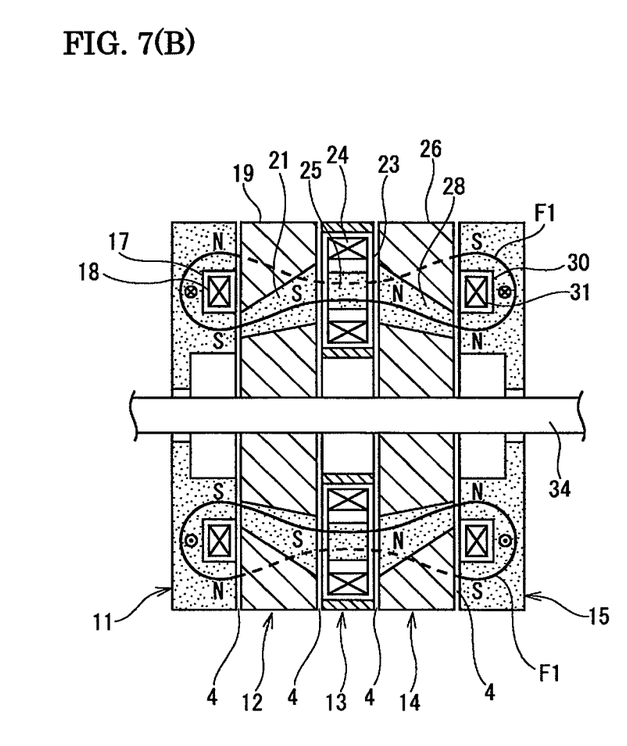

A power feeding device 32 is connected to the field coils 18 and 31 and the armature coils 24 through wiring such that DC currents are supplied to the field coils 18 and 31 and a three-phase AC current is supplied to the armature coils 24. By supplying those currents to the field coils 18 and 31 and the armature coils 24, the S-pole inductors 21 and 27 and the N-pole inductors 20 and 28 of the rotors 12 and 14 are magnetized with magnetic fluxes F1 excited as indicated by solid lines and broken lines in FIG. 7, whereby the rotors 12 and 14 are rotated based on the principle described below. A predetermined gap 4 is formed between adjacent two of the field side stator 11, the rotor 12, the armature side stator 13, the rotor 14, and the field side stator 15. In the inductor type motor 10 of this embodiment, therefore, each magnetic flux F1 passes through eight gaps 4. Assuming that a total size of the eight gaps 4 through which the magnetic flux F1 passes is a, a is set to be smaller than a size b of the gap 3 left around each of the field coils 18 and 31 and the armature coils 24 (i.e., a<b).

In addition, a liquid nitrogen tank 33 is connected to the heat-insulated coolant containers 17, 23 and 30 through heat-insulated piping for circulation of liquid nitrogen as a coolant.

The principle for operation of the inductor-type motor 10 will be described below.

When a DC current is supplied to the field coil 31 on the right side in FIG. 1, an S pole is generated on the outer peripheral side of the field coil 31 and an N pole is generated on the inner peripheral side thereof. Accordingly, as shown in FIGS. 4(A) and 4(B), magnetic fluxes on the S pole side are introduced into the S-pole inductors 27 through the other end surfaces 27b and the introduced S-pole magnetic fluxes appear at the one end surfaces 27a. Also, as shown in FIGS. 4(A) and 4(C), magnetic fluxes on the N pole side are introduced into the N-pole inductors 28 through the other end surfaces 28b and the introduced N-pole magnetic fluxes appear at the one end surfaces 28a. Because the other end surfaces 27b and 28b are arranged on the respective concentric circles extending along the outer and inner peripheries of the field coil 31, it is always ensured the S pole appears at the one end surfaces 27a of the S-pole inductors 27 and the N pole appears at the one end surfaces 28a of the N-pole inductors 28 even with the rotation of the rotor 14.

Based on the same principle, when a DC current is supplied to the field coil 18 on the left side in FIG. 1, it is always ensured the N pole appears at the one end surfaces 20a of the N-pole inductors 20 and the S pole appears at the one end surfaces 21a of the S-pole inductors 21 in the rotor 12.

When a three-phase AC current is supplied to the armature coils 24 in the above state, a rotating magnetic field is generated about the axis of the armature side stator 13 due to phase shifts among the three phases of the supplied AC current. The rotating magnetic field causes torque for each of the N-pole inductors 20 and 28 and the S-pole inductors 21 and 27 in the rotors 12 and 14 about the axis, whereby the rotors 12 and 14 are rotated and the rotary shaft 34 is driven for rotation.

With the construction described above, since the gaps 3 are formed around the field coils 18 and 31 and the armature coils 24 to keep the field coils 18 and 31 and the armature coils 24 from contacting the field side stators 11 and 15 and the flux collector 25 which serve as iron cores, the magnetic flux F2 excited around each of the field coils 18 and 31 and the armature coils 24 can be reduced. Therefore, the magnetic field acting on each of the field coils 18 and 31 and the armature coils 24, which are made of the superconducting wires, can be weakened to increase the current density in each of the field coils 18 and 31 and the armature coils 24 while avoiding deterioration of the superconducting characteristics. As a result, the coil size can be reduced.

According to this embodiment, since the gaps 3 are each formed as a sufficient space by setting the size b of the gap 3 to be larger than the total size a of the gaps 4 through which the magnetic flux F1 passes, the magnitude of the magnetic flux F2 can be greatly reduced.

While in this embodiment liquid nitrogen serving as a coolant is introduced to the gaps to cool the field coils and the armature coils, those coils may be indirectly cooled by cooling air around the coils with a coolant or a cooler instead of introducing the cooling to the gaps.

Also, while this embodiment is described in connection with the axial motor, the present invention can also be applied to a radial motor.

Figure 9A:
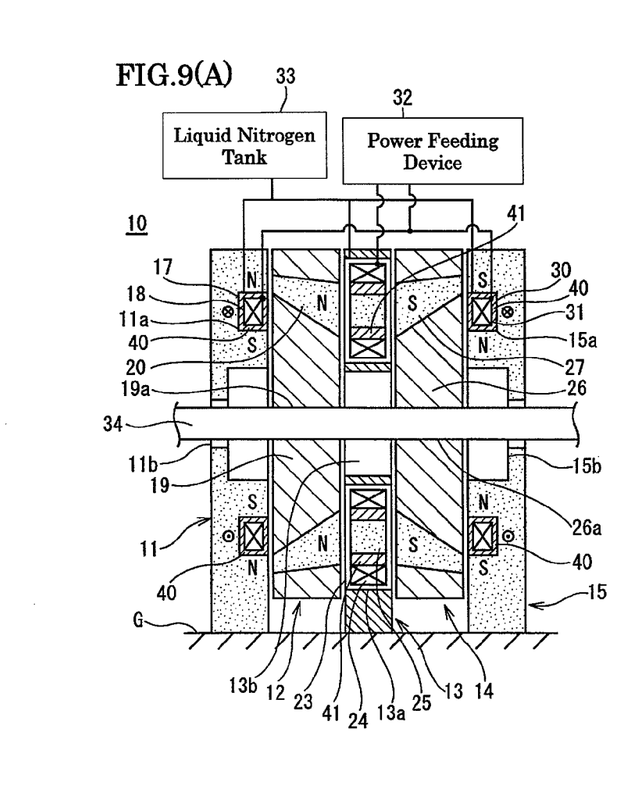
FIG. 9(A) is a sectional view of an inductor-type motor according to a second embodiment of the present invention.
Figure 9B:
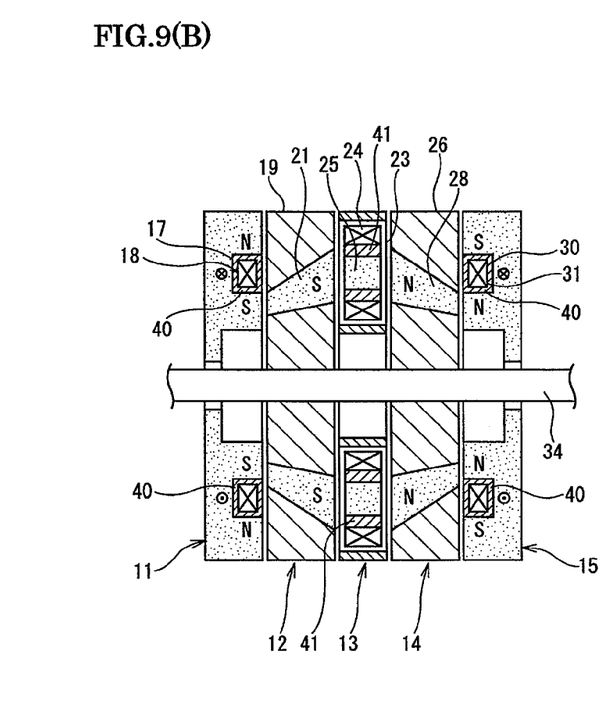
FIG. 9(B) is a sectional view of the inductor-type motor with rotors rotated 90° from their positions shown in FIG. 9(A).

FIG. 9 shows a second embodiment of the present invention.

In this embodiment, a nonmagnetic material 40 is interposed between each field side stator 11, 15 and each field coil 18, 31 to form a gap, and a nonmagnetic material 41 is interposed between each flux collector 25 and each armature coil 24 to form a gap.

Although the nonmagnetic material 40 is interposed between each field side stator 11, 15 and each field coil 18, 31, a space enabling a coolant to be introduced to each of the heat-insulated coolant containers 17 and 30 is secured such that the field coils 18 and 31 can be cooled.

Further, examples of the nonmagnetic material include FRP, stainless steel, tin, aluminum, and copper.

With the construction described above, the magnetic flux F2 excited around each of the field coils 18 and 31 and the armature coils 24 can be reduced. Therefore, the magnetic field acting on each of the field coils 18 and 31 and the armature coils 24, which are made of the superconducting wires, can be weakened to increase the current density in each of the field coils 18 and 31 and the armature coils 24 while avoiding deterioration of the superconducting characteristics. As a result, the coil size can be reduced.

It is to be noted that the other construction and the other advantages in operation are similar to those in the first embodiment and are not described here with the same reference numerals assigned to similar components.

INDUSTRIAL APPLICABILITY

The superconducting device according to the present invention can be applied to not only a motor for driving a ship, an automobile, etc. to run, but also a power generator, a transformer, and a Superconducting Magnetic Energy Storage (SMES).

The invention claimed is:

1. An axial-type superconducting motor constituted as an axial-type and inductor-type motor comprising, around a rotary shaft, an armature side stator including an armature coil attached to an iron core, a pair of rotors including inductors arranged on both sides of the armature side stator, and a pair of field side stators including field coils arranged on both sides of the rotors, the rotors being fitted over and fixed to the rotary shaft,
   wherein the armature coil and the field coils are each a coil formed of a superconducting wire, a gap is formed between the armature coil and an iron core to which the armature coil is attached, or/and a nonmagnetic material is interposed between the armature coil and the iron core, and gaps are formed between the field coils and the field side stators serving as iron cores, or/and nonmagnetic materials are interposed between the field coils and the field side stators,
   wherein the field coils are arranged such that an N pole and an S pole are positioned on respective concentric circles, and
   wherein the inductors in each of the rotors, which inductors serve as magnetic materials during energization of the armature coil and the field coils, are arranged such that an N-pole inductor positioned to face an N pole of the filed coil and an S-pole inductor positioned to face an S pole of the filed coil are alternately located in a circumferential direction.

2. A superconducting device comprising:
   a coil formed of a superconducting wire;
   an iron core to which the coil is attached; and
   a magnetic material arranged in a magnetic circuit and magnetized by magnetic flux, the magnetic circuit being generated by energization of the coil and passing through the iron core,
   wherein a gap is formed between the coil and the iron core, or/and a nonmagnetic material is interposed between the coil and the iron core,
   wherein the spacing between the coil and the iron core is set to equal to or greater than 0.1 mm, and
   wherein b>a is satisfied on an assumption that a is a total size of gaps in the magnetic circuit including the magnetized magnetic material and b is a size of the spacing between the coil and the iron core.

3. A superconducting device comprising:
   a coil formed of a superconducting wire;
   an iron core to which the coil is attached; and
   a magnetic material arranged in a magnetic circuit and magnetized by magnetic flux, the magnetic circuit being generated by energization of the coil and passing through the iron core,
   wherein a gap is formed between the coil and the iron core, or/and a nonmagnetic material is interposed between the coil and the iron core,
   wherein the spacing between the coil and the iron core is set to equal to or greater than 0.1 mm, and
   wherein the magnetic material arranged in the magnetic circuit is an inductor attached to a rotor, and the rotor is operated to rotate during the energization.

4. A superconducting device comprising:
   a coil formed of a superconducting wire;
   an iron core to which the coil is attached; and
   a magnetic material arranged in a magnetic circuit and magnetized by magnetic flux, the magnetic circuit being generated by energization of the coil and passing through the iron core,
   wherein a gap is formed between the coil and the iron core, or/and a nonmagnetic material is interposed between the coil and the iron core,
   wherein b>a is satisfied on an assumption that a is a total size of gaps in the magnetic circuit including the magnetized magnetic material and b is a size of the spacing between the coil and the iron core, and
   wherein the magnetic material arranged in the magnetic circuit is an inductor attached to a rotor, and the rotor is operated to rotate during the energization.

5. The superconducting device according to claim 2, wherein the magnetic material arranged in the magnetic circuit is an inductor attached to a rotor, and the rotor is operated to rotate during the energization.

* * * * *